(12) United States Patent
Dougherty

(10) Patent No.: US 10,851,666 B2
(45) Date of Patent: *Dec. 1, 2020

(54) ACTIVE SYNCHRONIZING RING

(71) Applicant: Rolls-Royce North American Technologies, Inc., Indianapolis, IN (US)

(72) Inventor: Michael P. Dougherty, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 181 days.

This patent is subject to a terminal disclaimer.

(21) Appl. No.: 15/908,756

(22) Filed: Feb. 28, 2018

(65) Prior Publication Data

US 2018/0187568 A1 Jul. 5, 2018

Related U.S. Application Data

(63) Continuation of application No. 14/576,858, filed on Dec. 19, 2014, now Pat. No. 9,932,851.

(Continued)

(51) Int. Cl.
*F01D 17/16* (2006.01)
*F04D 27/02* (2006.01)
(Continued)

(52) U.S. Cl.
CPC ........... *F01D 17/162* (2013.01); *F01D 9/041* (2013.01); *F02C 9/20* (2013.01); *F04D 27/0246* (2013.01);
(Continued)

(58) Field of Classification Search
CPC .... F01D 17/162; F01D 9/041; F04D 27/0246; F04D 29/563; F02C 9/20; F02C 9/22;
(Continued)

(56) References Cited

U.S. PATENT DOCUMENTS 3,861,822 A    1/1975  Wanger
4,373,859 A *  2/1983  Thebert .................. F01D 17/20
                                                    415/134

(Continued)

FOREIGN PATENT DOCUMENTS

EP    2211026 A2    7/2010
EP    2599968 A1    6/2013
JP    61169676 A *  7/1986  .............. F03B 3/183

OTHER PUBLICATIONS

European Search Report for Application No. EP 14 20 0434 dated Apr. 24, 2015.

*Primary Examiner* — Kenneth Bomberg
*Assistant Examiner* — Jesse M Prager
(74) *Attorney, Agent, or Firm* — Fishman Stewart PLLC

(57) ABSTRACT

An improved system, apparatus and method for controlling vane angles in a gas turbine engine, and more specifically, for correcting vane angle error in a gas turbine engine. An active synchronizing ring comprises a plurality of micro-actuators coupled to the synchronization ring to correct distortion in the synchronization ring. The micro-actuators apply a bending moment to the synchronization ring to cancel or compensate for synchronization ring distortion. The micro-actuators may be controlled open loop or closed loop. Strain sensors measure ring distortion and provide signals to the controller for closed loop control.

21 Claims, 4 Drawing Sheets

Related U.S. Application Data

(60) Provisional application No. 61/921,882, filed on Dec. 30, 2013.

(51) Int. Cl.
 *F02C 9/20* (2006.01)
 *F04D 29/56* (2006.01)
 *F01D 9/04* (2006.01)

(52) U.S. Cl.
 CPC ........ *F04D 29/563* (2013.01); *F05D 2240/12* (2013.01); *F05D 2260/407* (2013.01); *F05D 2260/57* (2013.01); *F05D 2270/44* (2013.01); *F05D 2270/62* (2013.01); *F05D 2270/66* (2013.01); *F05D 2270/808* (2013.01); *F05D 2300/505* (2013.01)

(58) Field of Classification Search
 CPC ........... F05D 2240/12; F05D 2260/407; F05D 2260/57; F05D 2270/44; F05D 2270/62; F05D 2270/66; F05D 2270/868; F05D 2300/505
 See application file for complete search history.

(56) References Cited

U.S. PATENT DOCUMENTS

| | | |
|---|---|---|
| 4,967,550 A | 11/1990 | Acton et al. |
| 4,979,874 A | 12/1990 | Myers |
| 5,700,129 A | 12/1997 | Kocian |
| 7,300,245 B2 | 11/2007 | Bouru |
| 7,919,938 B2 | 4/2011 | Harvey et al. |
| 7,927,067 B2 | 4/2011 | Rajamani et al. |
| 8,297,918 B2 | 10/2012 | Bhatnagar |
| 8,348,600 B2 | 1/2013 | Norris et al. |
| 8,435,000 B2 | 5/2013 | Wong et al. |
| 8,511,602 B2 | 8/2013 | Campbell et al. |
| 8,511,974 B2 | 8/2013 | Hood et al. |
| 2009/0297334 A1 | 12/2009 | Norris et al. |
| 2010/0014960 A1 | 1/2010 | Lee |
| 2012/0076641 A1 | 3/2012 | Jarrett, Jr. et al. |
| 2013/0142620 A1* | 6/2013 | Moore ................ F01D 17/162 415/13 |
| 2014/0286745 A1* | 9/2014 | Rusovici ............. F01D 17/162 415/1 |

\* cited by examiner ion ring.
ACTIVE SYNCHRONIZING RING

CROSS-REFERENCE TO RELATED APPLICATIONS

This application is a continuation of and claims priority to U.S. patent application Ser. No. 14/576,858, filed Dec. 19, 2014, which claims priority to U.S. Provisional Patent Application No. 61/921,882, filed Dec. 30, 2013, all of which are hereby incorporated by reference in their entirety.

FIELD OF TECHNOLOGY

An improved system for controlling vane angles in a gas turbine engine, and more specifically, a system for correcting vane angle error in a gas turbine engine.

BACKGROUND

Gas turbines typically include a compressor, a combustor and a turbine. The compressor pressurizes air flowing into the turbine. Pressurized air is discharged from the compressor and flows to the combustor. Air entering the combustor is mixed with fuel and combusted. Gas turbine engines operate by combusting fuel with compressed air to create heated gases. The heated gases are used to drive a turbine for rotating a fan to provide air to the compressor. Additionally, the heated gases are used to drive a turbine to power the compressor. One type of compressor is made up of many alternating rows of rotating and stationary blades called rotors and stators, respectively. In this type of compressor, known as a multistage compressor, each successive rotor and stator pair is called a compressor stage. Each stage increases the pressure and density of the air.

In a multistage compressor, rotor blades push air past stator vanes at each stage. The rotor blades pressurize the incoming air. The rotor also adds swirl to the flow, increasing the total energy carried in the flow by increasing the angular momentum of the air. The stator removes swirl from the flow, but is not a moving blade so it cannot add any net energy to the flow. The stator vanes adjust the flow and direction of the gas passing through the compressor. Stators serve two purposes: the stators convert the kinetic energy of the air into pressure and the stators redirect the path of the air from the rotors to the next stage.

One way of achieving more efficient performance of the gas turbine engine over its speed range is to use variable stator vanes which can optimize the incidence of the airflow onto subsequent compressor stage rotors. The first stationary row, which is located in front of the rotor, is typically called the inlet guide vanes (IGV). The IGV adds no energy to the flow rather it is designed to add swirl in the direction of rotor motion to lower the Mach number of the flow relative to the rotor blades. The variable stator vane stages comprise a plurality of vanes capable of pivoting about an axis. A common device for controlling variable pitch vanes is a synchronization ring which surrounds the casing. A synchronization ring is axially spaced from the casing by centralizers which are disposed between the synchronization ring and the casing to provide support for the ring. The synchronization ring controls the vanes through a plurality of levers pivotally attached to the synchronization ring at a first end and to the vane at a second end, causing the vane to pivot about its axis when the ring is rotated. A large actuator, pivotally attached to the synchronization ring at a first end, provides the gross movement of the synchronization ring.

The force applied to the levers by the vanes opposes the motion of the ring. The centralizers also contribute some friction to the synchronization ring. These forces cause distortion of the synchronization ring resulting in vane angle error. One solution has been to stiffen the synchronization ring at the cost of additional weight. However it would be desirable to provide a method and system for correcting vane angle error by correcting synchronization ring distortion.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

Figure 1:
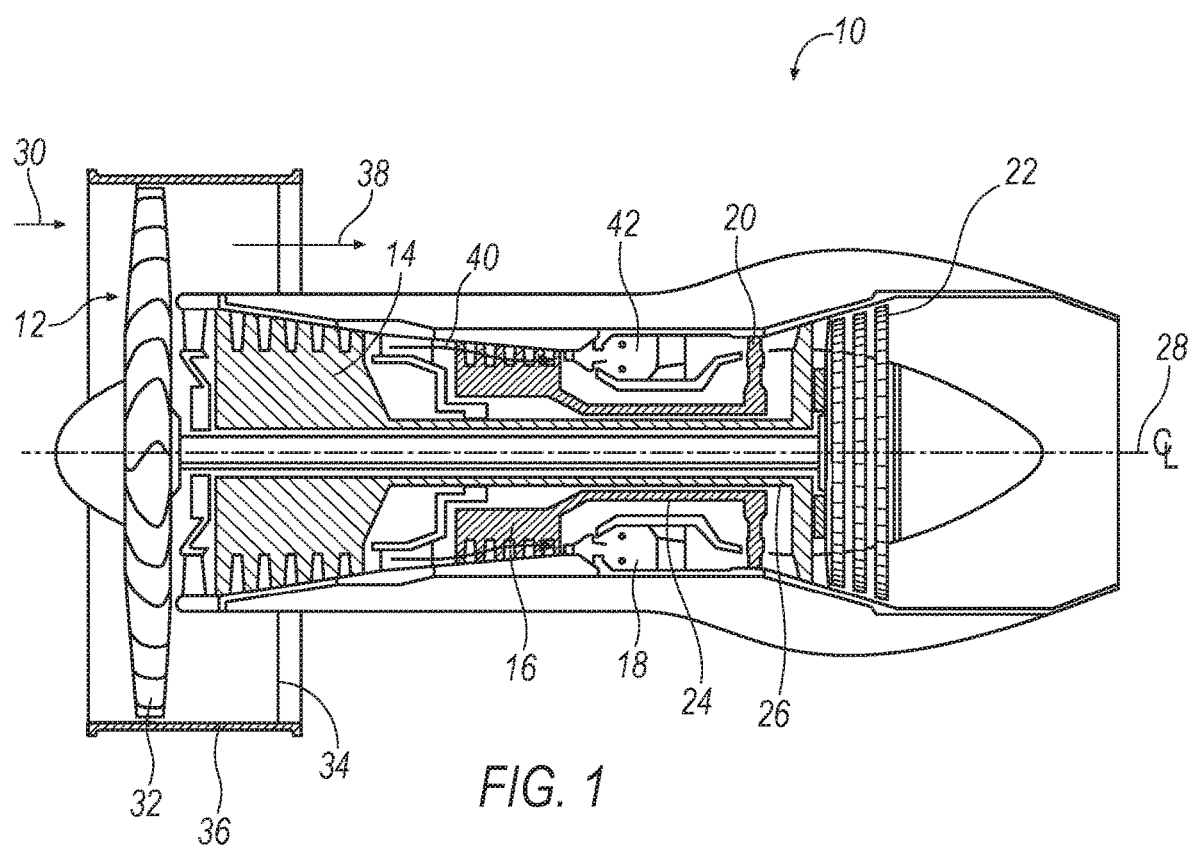
FIG. 1 illustrates an exemplary gas turbine engine.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described embodiments, and any further applications of the principles of the embodiments as described herein are contemplated as would normally occur to one skilled in the art to which the embodiment relates.

DETAILED DESCRIPTION

Exemplary illustrations of the system, apparatus and method for controlling individual vane angles in a gas turbine engine are shown in the attached drawings. An active synchronization ring comprises a plurality of micro-actuators coupled to synchronization ring. Each of the micro-actuators creates a bending moment in the synchronization ring to counter ring distortion. In one embodiment distortion is measured by a strain sensor applied to the synchronization ring.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20.

Figure 2:
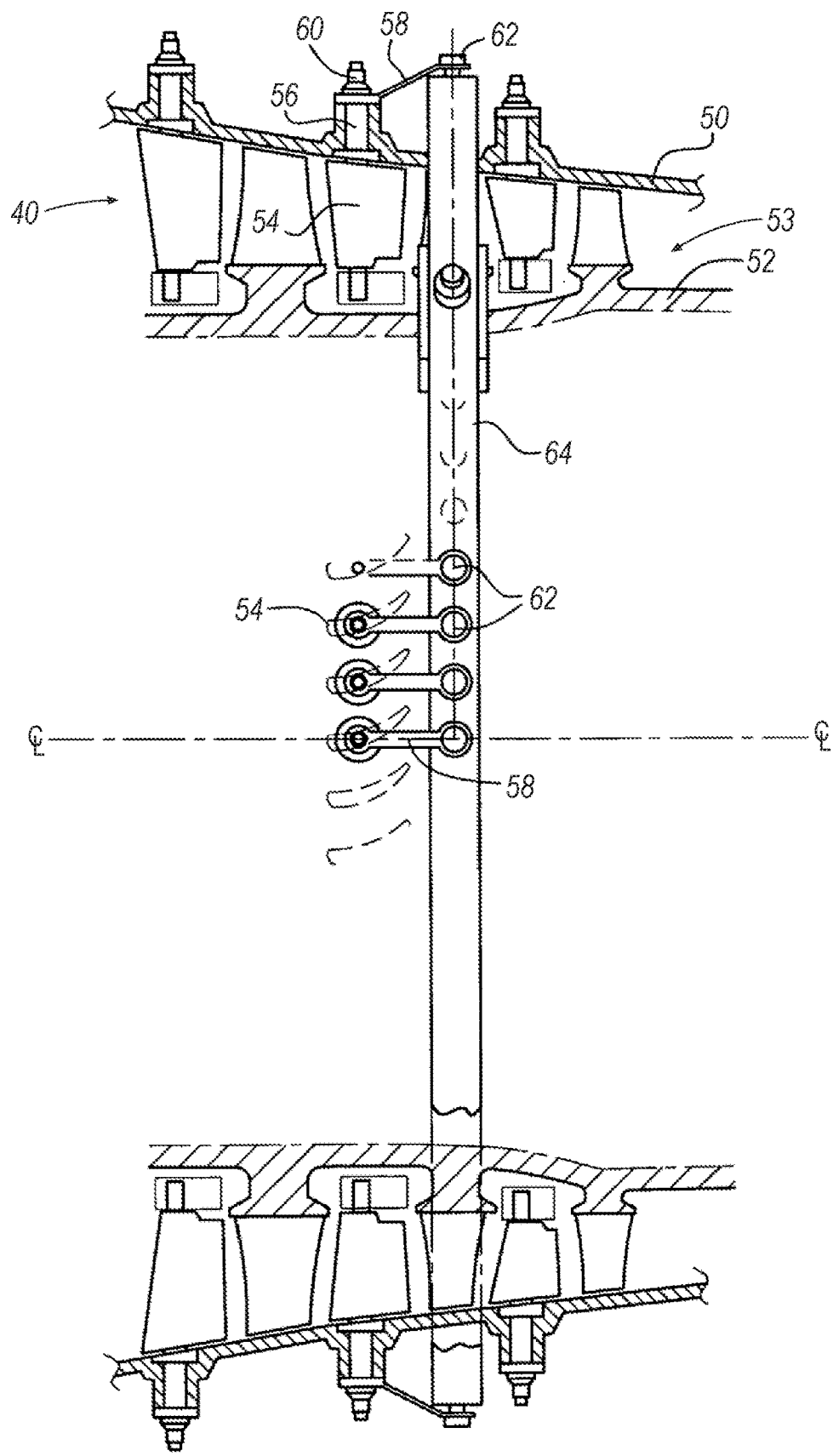
FIG. 2 illustrates an exemplary stator in a compressor stage.

Referring now also to FIG. 2, compressors 14, 16 comprise a casing 50 centered on the longitudinal center line axis 28 surrounding a rotor 52 defining a flow field 53. The compressors 14, 16 further comprise a plurality of stages formed of rotor and stator pairs. The stator comprises a plurality of vanes 54, which may also be variable guide vanes or variable area nozzles. The vanes 54 are pivotally mounted about a stem 56 passing through the casing 50. Each vane 54 is connected to a first end of a lever 58 on an upper stem 60. The second end of lever 58 is pivotally attached to a synchronization ring 64 by a pin 62. The synchronization ring 64 is supported and centered by a plurality of centralizers (not shown) which ride on the casing 50.

Figure 3:
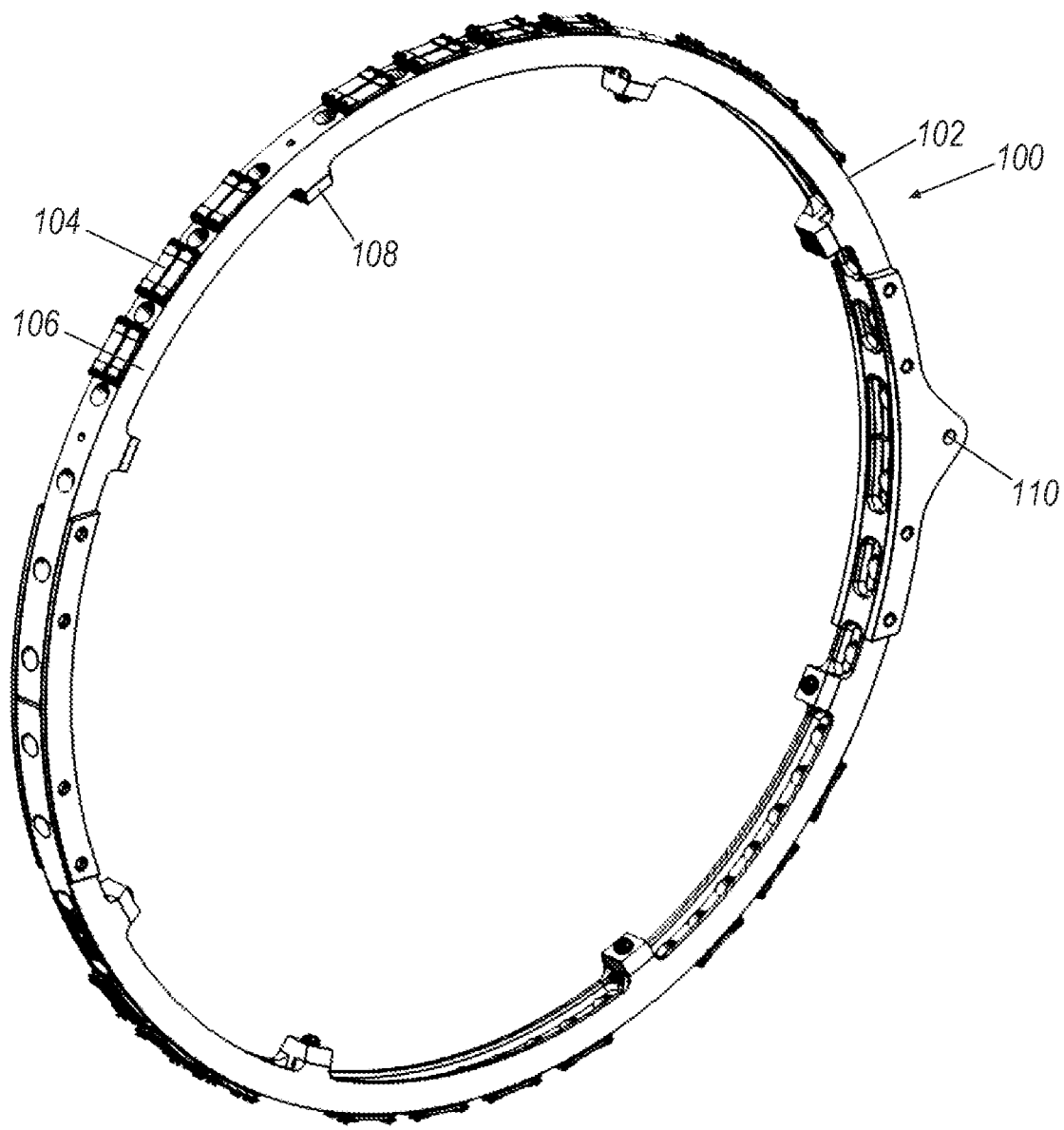
FIG. 3 illustrates an embodiment of an active synchronization ring.

Referring now also to FIG. 3, an embodiment of an active synchronization ring 100 includes a synchronization ring 102 and a plurality of micro-actuators 104 operably coupled to the synchronization ring 102. Examples of micro-actuators 104 include piezoelectric bending actuators, piezoelectric stacks, smart memory alloys, bimetal patches, or any other suitable substitutions known in the art. In one embodiment, the micro-actuators 104 are operably coupled to the ring 102 at their ends. Any suitable means may be employed for attaching the micro-actuators 104 to the synchronization ring 102, including, but not limited to, rivets, bolts, epoxies, welds, adhesives and the like. Alternatively, micro-actuators 104 may be an integral part of the structure of the synchronization ring 102, for example by placing the micro-actuators 104 between layers of composites blending metals together. Accordingly one embodiment features micro-actuators 104 embedded in the synchronization ring 102.

In the present embodiment of FIG. 3, active synchronization ring 100 includes sensors 106 located on the face of the synchronization ring 102. The sensors 106 measure ring distortion, and examples of which include various strain sensors, such as a strain gauge sensor. In another embodiment, although not shown, sensors 106 are provided for measuring individual vane position, examples of which include rotary variable differential transformers, resolvers, rotary potentiometers, or any other suitable substitutions known in the art for measuring angular position or displacement. Synchronization ring 102 is supported by a plurality of centralizers 108 which ride on the casing 50. An attachment point 110 provides a location for the arm of an actuator (not shown) to attach to the active synchronization ring 100.

The micro-actuators 104 create a bending moment in the synchronization ring 102. In one embodiment micro-actuators 104 have an input for receiving a control signal. In one embodiment a controller (not shown) provides signals to the micro-actuators 104 to command one or more micro-actuators 104 to apply a bending moment. Although not shown in the illustrations, it should be understood that some embodiments shall include power and control interfaces such as wiring harnesses and other electronics to communicate with the micro-actuators 104 and sensors 106.

Figure 4A:
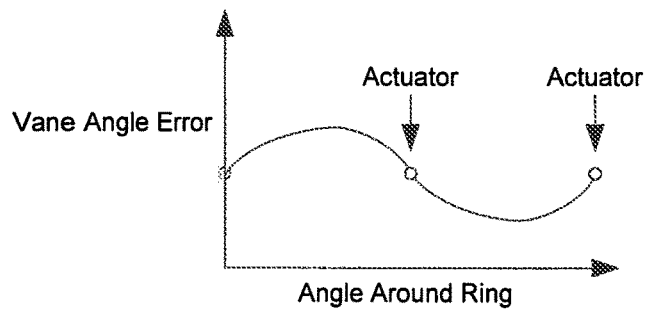
FIG. 4A is an exaggerated depiction of vane angle error.
Figure 4B:
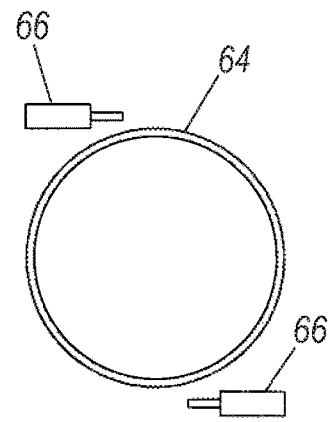
FIG. 4B is an illustration of a passive synchronization ring with two actuators.
Figure 4C:
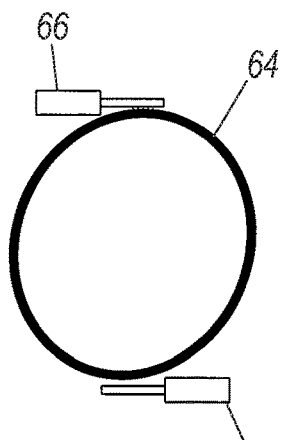
FIG. 4C is an illustration of a passive synchronization ring with two actuators acting on the synchronization ring experiencing distortion.

Referring now also to the graph in FIG. 4A, an exaggerated depiction of vane angle error is shown with respect to ring angle. FIG. 4A illustrates the effect of ring distortion resulting from force applied to the levers 58 by the vanes 54 and forces applied to the centralizers 108 by the actuators 66. Although the error at the attachment points of the actuators is about zero, the ring 102 experiences radial distortion due to the large distance between the actuators. Referring now also to FIG. 4B, an illustration of a passive synchronization ring 64 with two large actuators 66 is shown without force being applied to the passive ring 64. Referring now also to FIG. 4C, an illustration of a passive synchronization ring 64 with two large actuators 66 acting on the synchronization ring 64 is shown experiencing distortion. When actuating a synchronization ring 64 with one more actuators 66, the synchronization ring 64 may bend in between the actuators 66, causing vane angles to be different around the circumference of the engine 10. Without distortion compensation the deflection can severely limit the attainable accuracy on individual vane position. By combining micro-actuators with a large actuator greater precision of vane angle position may be obtained.

Traditionally the passive ring 64 is made as stiff as possible in an attempt to minimize deflection; however that approach has a direct trade-off in the form of added ring weight. A passive synchronization ring 64 may only limit the amount of deflection whereas an active approach enables the system to completely cancel the deflection in some cases. Another solution could be to add additional actuation points, however any reduction in ring weight would be more than offset by additional weight, cost and reliability of multiple actuators. For the same reasons direct control of the individual vanes would not be practical.

Figure 5A:
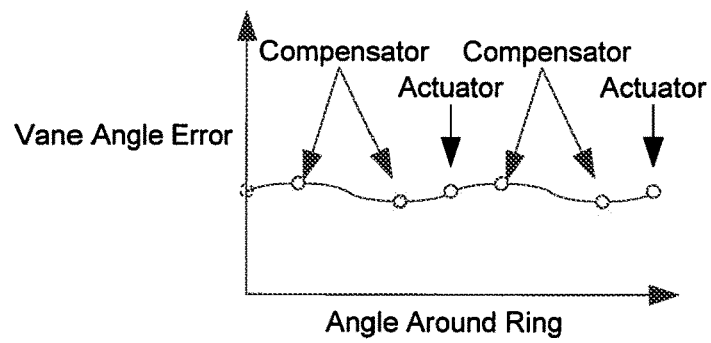
FIG. 5A is a depiction of vane angle error corrected by an active synchronization ring.
Figure 5B:
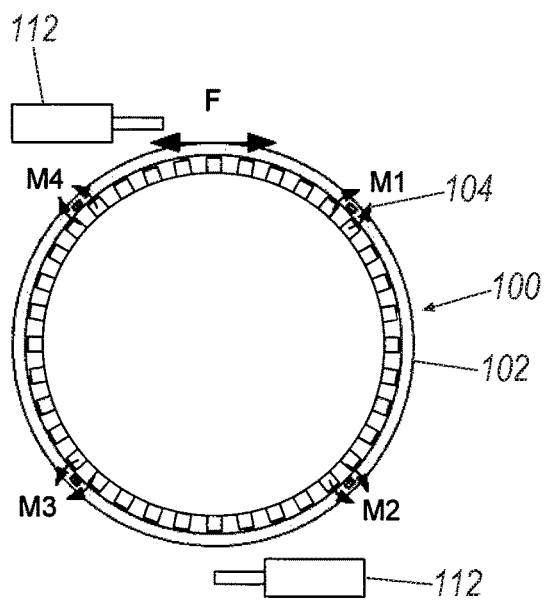
FIG. 5B is an illustration of an active synchronization ring with two actuators.

Referring now also to the graph in FIG. 5A, a depiction of vane angle error corrected by an active synchronization ring 100 shows the effect of the bending moments applied to the synchronization ring 102 by the micro-actuators 104. The micro-actuators 104 are used to reduce the variance in individual vane positions by applying a bending moment or augmenting the local properties of the ring 102, such as stiffness, to reduce the unwanted deflection. Referring now also to FIG. 5B, an illustration of an active synchronization ring 100 with two large actuators 112 is shown. The micro-actuators 104 apply bending moments M1 through M4 to compensate for the deflection in the ring 102.

One embodiment of a system for controlling individual vane angles in the gas turbine 10 comprises the active synchronization ring 100 and actuator 66 pivotally attached to the synchronization ring 102 for rotating the active synchronization ring 100 about an axis 28. A controller (not shown) may command the micro-actuators 104 in an open loop or closed loop control scheme. In one embodiment a schedule, developed by, for example, a model or testing, is employed to command the micro-actuators 104 based upon a control system input such as measured shaft speed. In one embodiment of a closed loop control scheme, distortion in the synchronization ring 102 is measured by the sensors 106, and signals from the sensors 106 are communicated to the controller which responds by commanding the micro-actuators 104 to counter the ring distortion by applying a bending moment. In another embodiment vane angle error is measured directly by sensors 106 for measuring individual vane position and signals from the sensors 106 are in communication with a controller, where the controller responds with a command signal to the micro-actuators 104 to compensate for distortion in the synchronization ring 102.

In an embodiment for correcting the vane angle error in the gas turbine 10, one method comprises a step of determining error in at least one vane angle and applying at least one bending moment to the synchronization ring 102 to compensate for synchronization ring distortion. Correction of vane angle error may be made by an open loop or closed loop control scheme. Vane angle error may be measured by distortion of the synchronization ring 102 by a plurality of strain sensors as well as by direct measurement of the vane 54.

It should be noted that micro-actuators 104 may be employed in the present system in a variety of places including on or inside the ring 102 between the large actuators 112, an interface between a large actuator 112 and ring 102, and an interface between the ring 102 and the levers 58, between the ring 102 and the centralizers 108, or on individual levers 58, depending on the desired effect.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A system for a gas turbine engine, comprising:
a synchronization ring associated with individual vane positions;
at least one sensor positioned along a circumference of the synchronization ring and configured to measure distortion of the synchronization ring; and
at least one actuator positioned along the circumference of the synchronization ring and in communication with the at least one sensor, the at least one sensor being configured to communicate the measured distortion to the at least one actuator, and the at least one actuator being configured to reduce variance in the individual vane positions by countering the measured distortion from the at least one sensor by applying a bending moment relative to the circumference of the synchronization ring.

2. The system of claim 1, wherein the synchronization ring includes a face, the at least one actuator includes a plurality of micro-actuators coupled to the synchronization ring, and the at least one sensor includes a plurality of sensors on the face of the synchronization ring.

3. The system of claim 2, wherein gas turbine engine includes a central rotational axis, and further comprising a controller configured to communicate the measured distortion by way of a control signal to the plurality of micro-actuators to create the bending moment in the synchronization ring about an axis substantially parallel with the central rotational axis of the gas turbine engine.

4. The system of claim 2, further comprising a plurality of inlet guide vanes pivotally attached to the synchronization ring and each one of the plurality of inlet guide vanes including individual vane positions, wherein the synchronization ring is annular, and the plurality of micro-actuators is positioned along the circumference of the synchronization ring.

5. The system of claim 4, further comprising a controller that provides a command signal to the at least one actuator in response to a vane angle error of the plurality of inlet guide vanes from distortion of the synchronization ring.

6. The system of claim 3, further comprising a shaft having a shaft speed, wherein the controller provides a command signal to the plurality of micro-actuators based on the shaft speed.

7. The system of claim 1, wherein the at least one actuator is at least one of a piezo bending actuator, a smart memory alloy, and a bimetal patch.

8. A device for a gas turbine engine, comprising:
a synchronization ring including a plurality of sensors and a plurality of micro-actuators, the plurality of sensors being in communication with the plurality of micro-actuators, and the plurality of sensors being configured to measure distortion along a circumference of the synchronization ring and communicate the measured distortion to the plurality of micro-actuators, and
wherein the plurality of micro-actuators is configured to create a bending moment relative to the circumference of the synchronization ring.

9. The device of claim 8, wherein the synchronization ring includes a face, the plurality of micro-actuators is coupled to the synchronization ring, and the plurality of sensors is on the face of the synchronization ring.

10. The device of claim 8, wherein the gas turbine engine includes a central rotational axis, and further comprising a controller configured to communicate the measured distortion by way of a control signal to the plurality of micro-actuators to create the bending moment in the synchronization ring about an axis substantially parallel with the central rotational axis of the gas turbine engine.

11. The device of claim 8, further comprising a plurality of inlet guide vanes pivotally attached to the synchronization ring and respective ones of a plurality of inlet guide vanes including individual vane positions, wherein the synchronization ring is annular, and the plurality of micro-actuators is positioned along the circumference of the synchronization ring.

12. The device of claim 11, further comprising a controller that provides a command signal to at least one of the plurality of micro-actuators in response to a vane angle error of the plurality of inlet guide vanes from distortion of the synchronization ring.

13. The device of claim 10, further comprising a shaft having a shaft speed, wherein the controller provides a command signal to the plurality of micro-actuators based on the shaft speed.

14. The device of claim 8, wherein the plurality of micro-actuators includes at least one of a piezo bending actuators, smart memory alloys, and bimetal patches.

15. A device for a gas turbine engine, comprising:
a synchronization ring including a circumference;
a plurality of sensors along the circumference;
a plurality of micro-actuators along the circumference;
a shaft,
wherein the plurality of sensors is in communication with the plurality of actuators, measures distortion of the synchronization ring, and communicates the measured distortion to the plurality of micro-actuators, and
wherein the plurality of micro-actuators creates a bending moment in the synchronization ring.

16. The device of claim 15, wherein the synchronization ring includes a face, the plurality of micro-actuators is coupled to the synchronization ring and the plurality of sensors is on the face of the synchronization ring.

17. The device of claim 15, wherein the gas turbine engine includes a central rotational axis, and further comprising a controller configured to communicate the measured distortion by way of a control signal to the plurality of micro-actuators to create the bending moment in the synchronization ring about an axis substantially parallel with the central rotational axis of the gas turbine engine.

18. The device of claim 15, further comprising a plurality of inlet guide vanes pivotally attached to the synchronization ring and each one of the plurality of inlet guide vanes including individual vane positions, wherein the synchronization ring is annular.

19. The device of claim 15, wherein the plurality of micro-actuators is configured to reduce variance in individual vane positions by applying the bending moment.

20. The device of claim 15, further comprising a controller that provides a control signal to at least one of the plurality of micro-actuators further in response to a vane angle error of the plurality of inlet guide vanes from distortion of the synchronization ring.

21. The device of claim 15, wherein the plurality of micro-actuators is at least one of a piezo bending actuators, smart memory alloys, and bimetal patches.

* * * * *